(12) United States Patent
Holmes et al.

(10) Patent No.: US 7,922,796 B2
(45) Date of Patent: Apr. 12, 2011

(54) CHEMICAL AND PARTICULATE FILTERS CONTAINING CHEMICALLY MODIFIED CARBON NANOTUBE STRUCTURES

(75) Inventors: Steven J. Holmes, Guilderland, NY (US); Mark C. Hakey, Fairfax, VT (US); David V. Horak, Essex Junction, VT (US); James G. Ryan, Niskayuna, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/652,908

(22) Filed: Jan. 6, 2010

(65) Prior Publication Data

US 2010/0119422 A1 May 13, 2010

Related U.S. Application Data

(62) Division of application No. 12/168,171, filed on Jul. 7, 2008, now Pat. No. 7,708,816, which is a division of application No. 10/904,633, filed on Nov. 19, 2004, now Pat. No. 7,459,013.

(51) Int. Cl.
*B01D 59/26* (2006.01)
(52) U.S. Cl. .............. 96/108; 96/121; 96/134; 96/135; 96/153; 96/154; 423/447.2; 423/447.3; 977/742; 977/745; 977/748; 977/750; 977/752; 355/30
(58) Field of Classification Search .............. 96/108, 96/121, 134, 135, 153, 154; 423/447.2, 447.3; 977/742, 745, 748, 750, 752; 355/30
See application file for complete search history.

(56) References Cited

U.S. PATENT DOCUMENTS

| | | | |
|---|---|---|---|
| 5,371,577 A | 12/1994 | Fujimura et al. | |
| 6,099,960 A | 8/2000 | Tennent et al. | |
| 6,149,775 A | 11/2000 | Tsuboi et al. | |
| 6,183,714 B1 | 2/2001 | Smalley et al. | |
| 6,232,706 B1 | 5/2001 | Dai et al. | |
| 6,264,045 B1 | 7/2001 | Wilson et al. | |
| 6,399,785 B1 | 6/2002 | Murphy et al. | |
| 6,432,866 B1 | 8/2002 | Tennent et al. | |
| 6,613,875 B1 | 9/2003 | Ghadiri | |
| 6,645,271 B2 | 11/2003 | Seguin et al. | |
| 6,645,455 B2 | 11/2003 | Margrave et al. | |
| 6,692,551 B2 | 2/2004 | Wernholm et al. | |

(Continued)

FOREIGN PATENT DOCUMENTS

JP 2006095429 4/2006

(Continued)

OTHER PUBLICATIONS

Notice of Allowance (Mail Date Dec. 15, 2009) for U.S. Appl. No. 12/168,171, filed Jul. 7, 2008; Confirmation No. 7008.

(Continued)

*Primary Examiner* — Robert J Hill, Jr.
*Assistant Examiner* — Christoper P Jones
(74) *Attorney, Agent, or Firm* — Schmeiser, Olsen & Watts; Ian D. MacKinnon

(57) ABSTRACT

A carbon nanotube filter. The filter including a filter housing; and chemically active carbon nanotubes within the filter housing, the chemically active carbon nanotubes comprising a chemically active layer formed on carbon nanotubes or comprising chemically reactive groups on sidewalls of the carbon nanotubes; and media containing the chemically active carbon nanotubes.

10 Claims, 10 Drawing Sheets

U.S. PATENT DOCUMENTS

| | | | |
|---|---|---|---|
| 6,756,025 | B2 | 6/2004 | Colbert et al. |
| 6,764,628 | B2 | 7/2004 | Lobovsky et al. |
| 6,765,949 | B2 | 7/2004 | Chang |
| 7,674,324 | B2 * | 3/2010 | Holmes et al. ............. 96/108 |
| 2002/0090330 | A1 | 7/2002 | Smalley et al. |
| 2002/0110513 | A1 | 8/2002 | Margrave et al. |
| 2002/0136681 | A1 | 9/2002 | Smalley et al. |
| 2002/0159943 | A1 | 10/2002 | Smalley et al. |
| 2002/0187896 | A1 | 12/2002 | Ryoo et al. |
| 2003/0041733 | A1 | 3/2003 | Seguin et al. |
| 2003/0159586 | A1 | 8/2003 | Seguin et al. |
| 2003/0165418 | A1 | 9/2003 | Ajayan et al. |
| 2003/0180491 | A1 | 9/2003 | Hirsch et al. |
| 2003/0197456 | A1 | 10/2003 | Den et al. |
| 2004/0007528 | A1 | 1/2004 | Bakajin et al. |
| 2004/0038251 | A1 | 2/2004 | Smalley et al. |
| 2004/0118285 | A1 | 6/2004 | Kim et al. |
| 2004/0131811 | A1 | 7/2004 | Lee et al. |
| 2004/0149209 | A1 | 8/2004 | Dai et al. |
| 2004/0211920 | A1 | 10/2004 | Derksen et al. |
| 2004/0223900 | A1 | 11/2004 | Khabashesku et al. |
| 2005/0259234 | A1 | 11/2005 | Hirukawa et al. |
| 2006/0021510 | A1 | 2/2006 | Henley et al. |
| 2006/0027499 | A1 | 2/2006 | Ajayan et al. |
| 2007/0084797 | A1 * | 4/2007 | Cooper et al. ............. 210/660 |
| 2007/0113779 | A1 | 5/2007 | Wong et al. |
| 2007/0231946 | A1 | 10/2007 | Orlowski et al. |

FOREIGN PATENT DOCUMENTS

| | | |
|---|---|---|
| WO | WO02060579 | 8/2002 |
| WO | WO2004053955 A1 | 6/2004 |

OTHER PUBLICATIONS

Notice of Allowance (Mail Date Oct. 16, 2009) for U.S. Appl. No. 12/168,183, filed Jul. 7, 2008; Confirmation No. 7029.

Office Action (Mail Date Oct. 29, 2009) for U.S. Appl. No. 12/166,865, filed Jul. 2, 2008; Confirmation No. 4394.

Boul et al.; Reversible Sidewall Functionalization of Buckytubes; Chemical Physics Letters 310; Sep. 3, 1999; pp. 367-372.

Banerjee et al.; Selective Metallic Tube Reactivity in the Solution-Phase Osmylation of Single-Walled Carbon Nanotubes; J. Am. Chem. Soc. 2004, 126; pp. 2073-2081.

Mitchell et al.; Dispersion of Functionalized Carbon Nanotubes in Polystyrene; Macromolecules 2002, vol. 35, No. 23; pp. 8825-8830.

Bahr et al.; Functionalization of Carbon Nanotubes by Electrochemical Reduction of Aryl Diazonium Salts: A Bucky Paper Electrode; J. Am. Chem. Soc. 2001, 123; pp. 6536-6542.

Guiru et al.; Deposition of the platinum crystals on the carbon nanotubes; Chinese Science Bulletin; vol. 45, No. 2, Jan. 2000; pp. 134-136.

Seeger et al.; SiOx-coating of carbon nanotubes at room temperature; Chemical Physics Letters 339 (2001); pp. 41-46.

Zhang et al.; Formation of metal nanowires on suspended single-walled carbon nanotubes; 2000 American Institute of Physics; Applied Physics Letters, vol. 77, No. 19; Nov. 6, 2000; pp. 3015-3017.

Zhang et al.; Metal coating on suspended carbon nanotubes and its implication to metal-tube interaction; Chemical Physics Letters 331 (2000); pp. 35-41.

Erickson et al.; Sulfonation of polymer surfaces—I. Improving adhesion of polypropylene and polystyrene to epoxy adhesives via gas phase sulfonation; J. Adhesion Sci. Technol., vol. 11, No. 10 (1997); pp. 1249-1267.

Yu et al.; Platinum Deposition on Carbon Nanotubes via Chemical Modification; 1998 American Chemical Society; Chem. Mater., vol. 10, No. 3, 1998; pp. 718-722.

Chen et al.; Plasma Activation of Carbon Nanotubes for Chemical Modification; 2001 American Chemical Society; J. Phys. Chem. B. 2001, 105; pp. 618-622.

Dai et al.; Functionalized surfaces based on polymers and carbon nanotubes for some biomedical and optoelectronic applications; Institute of Physics Publishing Ltd; Nanotechnology 14 (2003); pp. 1081-1097.

Mickelson et al.; Fluorination of single-wall carbon nanotubes; Chemical Physics Letters 296 (1998); pp. 188-194.

Bahr et al.; Covalent chemistry of single-wall carbon nanotubes; Jan. 28, 2002 J. Mater. Chem. 2002, 12 ; pp. 1952-1958.

Toupin, Laurie Ann; "Carbon Nanotubes Provide Key to Gas Filters." Design News. Nov. 18, 2002. p. 17. http://www.designnews.com.

Srivastava et al. "Carbon Nanotube Filters", Nature Materials, vol. 3, Sep. 2004, pp. 610-614. Published online Aug. 1, 2004.

* cited by examiner

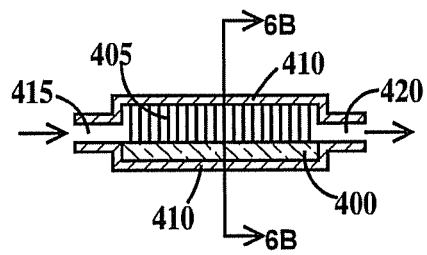
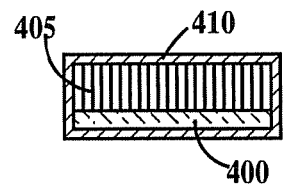
*FIG. 6A*  *FIG. 6B*
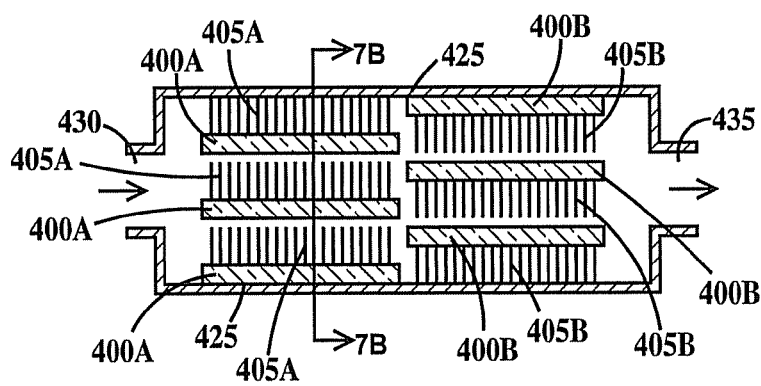
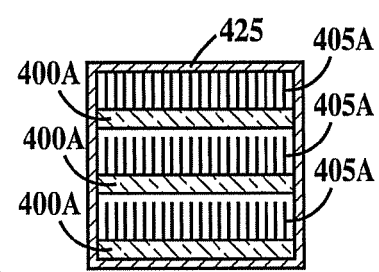
*FIG. 7A*  *FIG. 7B*
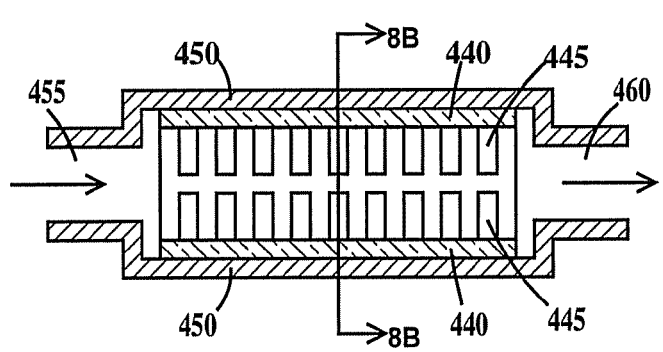
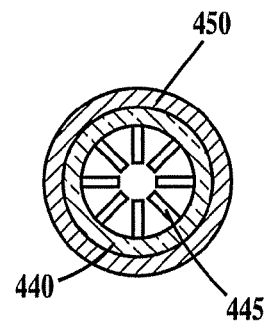
*FIG. 8A*  *FIG. 8B*
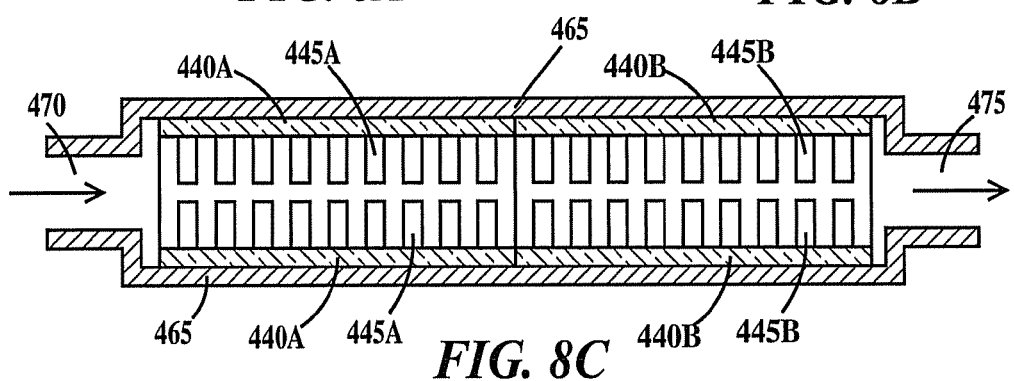
*FIG. 8C*

CHEMICAL AND PARTICULATE FILTERS CONTAINING CHEMICALLY MODIFIED CARBON NANOTUBE STRUCTURES

This application is a division of U.S. patent application Ser. No. 12/168,171 filed Jul. 7, 2008, now U.S. Pat. No. 7,708, 816 issued May 4, 2010 which is a division of U.S. patent application Ser. No. 10/904,633 filed on Nov. 19, 2004, now U.S. Pat. No. 7,459,013 issued Dec. 2, 2008.

FIELD OF THE INVENTION

The present invention relates to the field of chemical and particulate filters; more specifically, it relates to chemical and particulate filters containing chemically modified carbon nanotube structures and methods of making same.

BACKGROUND OF THE INVENTION

In advanced semiconductor manufacturing, airborne contaminants can cause degradation of photoresist layers and optical elements of advanced photolithography systems such as immersion lithography tools, wherein airborne molecules can polymerize when exposed to the very high energy light beams of advanced lithography tools. The resultant polymer can then coat the optics degrading the image quality of the tool and coat the tooling causing degraded alignment tolerances. Additionally contaminant molecules can be adsorbed by the photoresist layer, interfere with the photochemistry and cause photoresist defects. Conventional filters are unable to remove much of these airborne molecules. Similarly, contaminant molecules can exist in the gas streams used for purging and operating of various components of the tool.

Therefore there is a need for an advanced chemical and particulate filter for applications requiring extremely low levels of contaminants in the filtered air and/or gas streams.

SUMMARY OF THE INVENTION

The present invention utilizes carbon nanotubes having a chemically active layer or carbon nanotubes having chemically reactive groups on the sidewalls of the carbon nanotubes as a filter media. The small size of carbon nanotubes provides a large surface area and the chemically active layer or chemically reactive groups provides sites for attracting, binding or chemically reacting with contaminant molecules in the air or gas streams being filtered.

A first aspect of the present invention is a method of forming a carbon nanotube filter, comprising: (a) providing a carbon source and a carbon nanotube catalyst; (b) growing carbon nanotubes by reacting the carbon source with the nanotube catalyst; (c) forming chemically active carbon nanotubes by forming a chemically active layer on the carbon nanotubes or forming chemically reactive groups on sidewalls of the carbon nanotubes; and (d) placing the chemically active nanotubes in a filter housing.

A second aspect of the present invention is a filter, comprising: a filter housing; and chemically active carbon nanotubes within the filter housing, the chemically active carbon nanotubes comprising a chemically active layer formed on carbon nanotubes or comprising chemically reactive groups on sidewalls of the carbon nanotubes.

A third aspect of the present invention is a filter, comprising: a filter housing; and chemically active carbon nanotubes within the filter housing, the chemically active carbon nanotubes comprising a chemically active layer formed on carbon nanotubes or comprising chemically reactive groups on sidewalls of the carbon nanotubes; and media containing the chemically active carbon nanotubes.

A fourth aspect of the present invention is an immersion exposure system for exposing a photoresist layer on a top surface of a wafer to light, comprising: an environment chamber containing a light source, one or more focusing lenses, a mask holder, a slit, an immersion head and a wafer stage, the light source, the one or more focusing lenses, the mask holder, the slit, and the immersion head aligned to an optical axis, the wafer stage moveable in two different orthogonal directions, each the orthogonal direction orthogonal to the optical axis, the mask holder and the slit moveable in one of the two orthogonal directions, the immersion head having a chamber having a flat top, a sidewall and a bottom opening, the flat top transparent to selected wavelengths of light; means for filling the chamber of the immersion head with an immersion liquid, the chamber of the immersion head aligned to the optical axis; a filter in a sidewall of the environment chamber, the filter comprising: a filter housing; and chemically active carbon nanotubes within the filter housing, the chemically active carbon nanotubes comprising a chemically active layer formed on carbon nanotubes or comprising chemically reactive groups on sidewalls of the carbon nanotubes; and means for forcing air or inert gas first through the filter then into the environment chamber and then out of the environment chamber.

BRIEF DESCRIPTION OF DRAWINGS

The features of the invention are set forth in the appended claims. The invention itself, however, will be best understood by reference to the following detailed description of an illustrative embodiment when read in conjunction with the accompanying drawings, wherein:

FIG. 6A is a cross-section view and FIG. 6B is a cross-section view through line 6B-6B of FIG. 6A of a first exemplary chemically active nanotube filter according to the present invention;

FIG. 7A is a cross-section view and FIG. 7B is a cross-section view through line 7B-7B of FIG. 7A of a second exemplary chemically active nanotube filter according to the present invention;

FIG. 8A is a cross-section view and FIG. 8B is a cross-section view through line 8B-8B of FIG. 8A of a third exemplary chemically active nanotube filter according to the present invention;

FIG. 8C, is an extension of the third exemplary chemically active nanotube filter of FIGS. 8A and 8B;

DETAILED DESCRIPTION OF THE INVENTION

Carbon nanotubes are more correctly called carbon fullerenes, which are closed-cage molecules composed of $sp^2$-hybridized carbon atoms arranged in hexagons and pentagons. There are two types of carbon fullerenes, namely closed spheroid cage fullerenes also called "bucky balls" and fullerene tubes. Fullerene tubes come in two types, single wall fullerenes tubes, which are hollow tube like structures or and multi-wall fullerene tubes. Multi-wall fullerenes resemble sets of concentric cylinders. The present invention utilizes single-wall carbon fullerenes, hereinafter called single-wall nanotubes (SWNT) and multi-wall carbon fullerenes, hereafter called multi-wall nanotubes (MWNT). For the purposes of the present invention, the term carbon nanotube (CNT) denotes either a carbon SWNT or a carbon MWNT.

The term chemically active nanotube filter refers to a filter containing carbon nanotubes having a chemically active layer as a filter media or carbon nanotubes having chemically reactive groups on the sidewalls of the carbon nanotubes as the filter media.

Figure 1A:
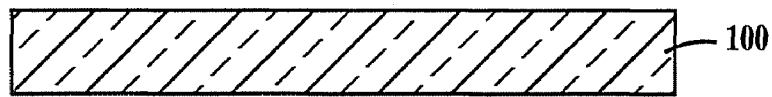
FIGS. 1A through 1E are cross-sectional views illustrating a first method of making carbon nanotubes.

FIGS. 1A through 1E are cross-sectional views illustrating a first method of making CNTs. In FIG. 1A, a substrate 100 is provided. Substrate 100 (or an uppermost layer on the substrate) is formed from a material that does not allow growth of a catalytic layer on the surface of substrate 100, so growth of CNTs on the surface of the substrate can not occur. Note, as described infra, the catalyst itself (in one example, Fe (iron) atoms) is supplied from a gas stream. In one example substrate 100 is a silicon substrate. Examples of other suitable substrates include substrates formed from, ceramic, metal, glass, plastic or having an upper layer of polysilicon, copper, gold, glass, or plastic.

Figure 1B:
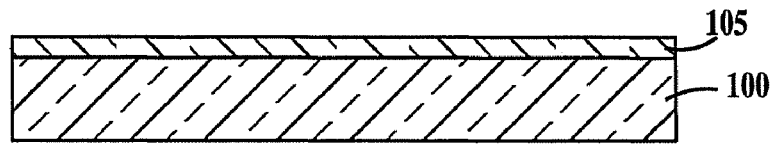

In FIG. 1B, a template layer 105 is formed on substrate 100. Template layer 105 is formed from a material that allows formation of a catalytic layer on the surface of template layer 100. It is this catalytic layer that catalyzes growth of nanotubes on the surface of the template layer. In one example template layer 105 is silicon dioxide. Examples of other suitable template layers include silicon oxy-nitride, aluminum oxide, magnesium oxide, and indium-tin oxide.

Figure 1C:
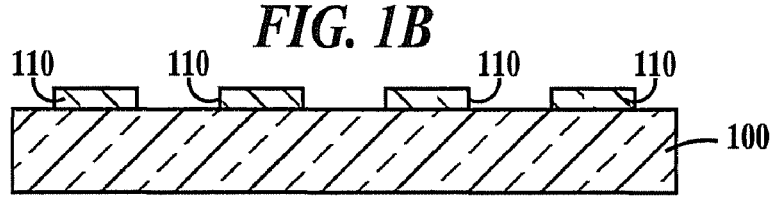

In FIG. 1C, template layer 105 (see FIG. 1B) is patterned into template islands 110. Template islands 110 may also be considered a patterned catalytic layer. This may be performed, for example by photolithographic process to form protective photoresist islands on top of template layer 105, etching away the template layer where the template layer is not protected by photoresist islands to expose the substrate and then removing the protective photoresist islands.

Alternatively, the processes described in relation to FIGS. 1B and 1C may be replaced by evaporation or deposition of template islands 110 through a shadow mask onto substrate 100. An example of a shadow mask is a metal mask having a pattern of through holes. Evaporation or deposition species can pass through the holes and deposit on the substrate. Where there is no hole, the evaporated species is deposited on the shadow mask.

In another alternative, the template layer is not patterned, the entire surface of template layer 105 becoming one large template island 110.

Figure 1D:
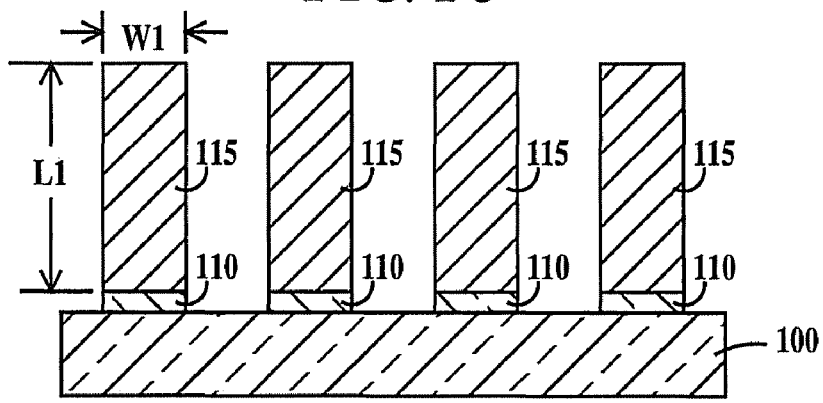

In FIG. 1D, bundles of CNTs 115 are grown on template islands 110 by exposing substrate 100 and template islands 110 to a vapor mixture of a CNT precursor and a CNT catalyst at an elevated temperature. In one example, the CNT precursor is a xylene or xylene isomer mixture ($C_8H_{10}$) and the CNT catalyst is ferrocene ($Fe(C_5H_5)_2$) heated to between about 600° C. to about 1100° C. Bundles of CNTs 115 take the shape of template islands 110. If template islands 110 are circular a cylindrical bundle of CNTs (having a circular cross-section) will result. If template islands 110 are rectangular, a rectangular bundle of CNTs with a rectangular cross-section will result. Bundles of CNTs 115 have a length L1 and a width W1. In one example L1 is between about 100 microns about 500 microns and W1 is about 10 microns to about 50 nm. In one example, the individual CNTs of each bundle of CNTs 115 formed by this first method are predominantly MWNTs having diameters of between about 10 Å and about 2000 Å.

A more detailed discussion of formation of CNTs according to the first method of forming CNTs may be found in United States Patent Publication US 2003/0165418 to Ajayan et al., filed on Feb. 11, 2003, which is hereby incorporated by reference in its entity.

Figure 1E:
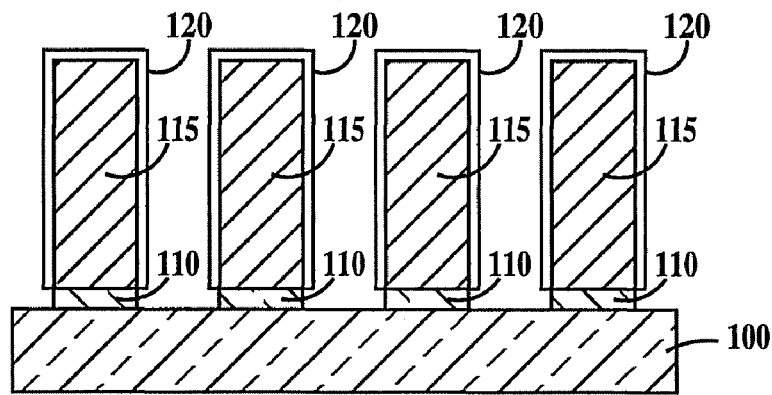

In FIG. 1E, a chemically active layer 120 is formed on bundles of CNTs 115 and then substrate 100 with attached bundles of CNTs is packaged into filters. Formation of chemically active layer 120 comprises forming a chemically active layer on CNTs in each bundle of CNTs 115 or forming chemically reactive groups on the sidewalls of CNT in each bundles of CNTs 115. Examples of chemically active layers include layers containing osmium dioxide ($OsO_2$), platinum (Pt), titanium (Ti), nickel (Ni), gold (Au), palladium (Pd), aluminum (Al) layers, Fe, or silicon oxides ($SiO_x$). Examples of chemically active groups include alkyl groups, aryl groups, fluoro groups, pyrrolidine groups, hydrogen, amino, aldehyde, carboxylate, amido, imino, and sulfonic groups. Forming of chemically active layer 120 is discussed infra in more detail.

In an alternative version of the first method of forming CNTs described supra, the steps of patterning template layer 105 (see FIG. 1B) into template islands are not performed and a random array of CNTs will be produced.

Figure 2A:
FIGS. 2A through 2E are cross-sectional views illustrating a second method of making carbon nanotubes.

FIGS. 2A through 2E are cross-sectional views illustrating a second method of making CNTs. In FIG. 2A, a substrate 125 is provided. Substrate 125 (or an uppermost layer on the substrate) is formed from a material that is treated to form a nanoporous surface layer 130. In one example substrate 125 is a silicon substrate and nanoporous layer 130 comprises an upper nanoporous layer having a pore size of about 3 nm on top of a lower nanoporous layer having a pore size of about 300 nm. In one example, when substrate 125 comprises silicon with a <100> crystal plane orientation, nanoporous layer 130 may be formed by electrochemical etching of the surface of substrate 125 in an ethanol, hydrofluoric acid mixture.

Figure 2B:
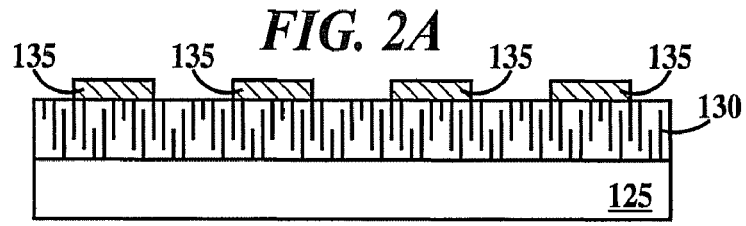

In FIG. 2B, template islands 135 are formed on nanoporous layer 130. In one example template islands 135 are formed from iron by evaporation through a shadow mask.

Figure 2C:
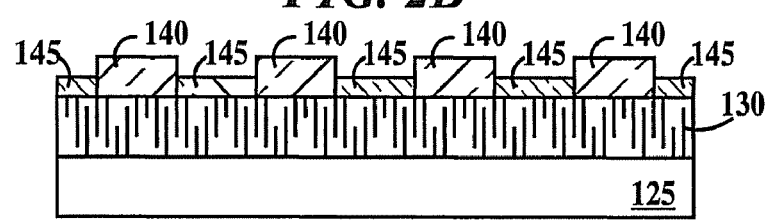

In FIG. 2C, substrate 125, nanoporous layer 130 and template islands 135 (see FIG. 2B) are oxidized forming catalytic template islands 140 from the template islands. Any portion of the surface of nanoporous layer 135 not protected by a catalytic template island 140 is converted to a silicon dioxide layer 145. In the example that templates islands 135 (see FIG. 2B) are iron, then catalytic template islands 140 comprise iron oxide. Iron oxide is a material that allows (catalyzes) growth of nanotubes on its surface. Therefore, catalytic template islands 140 may also be considered a patterned catalytic layer.

Figure 2D:
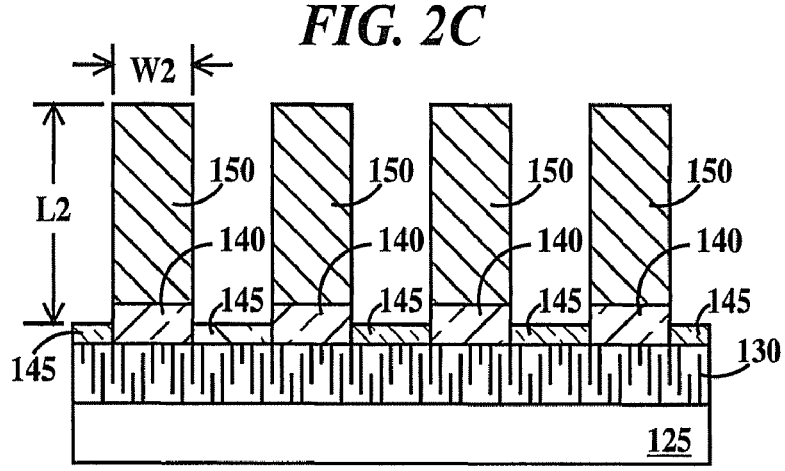

In FIG. 2D, CNT bundles 150 (each CNT bundle containing a multiplicity of individual CNTs) are grown on catalytic template islands 140 by exposing substrate 125 and catalytic template islands 140 to a CNT precursor vapor at an elevated temperature. In one example, the CNT precursor is ethylene heated to about 700° C. If catalytic template islands 140 are circular, cylindrical CNTs bundles (having a circular cross-section) will result. If catalytic template islands 140 are rectangular, CNT bundles with a rectangular cross-section will result. CNT bundles 150 have a length L2 and a width W2. In one example L2 is between about 30 microns about 250 microns and W2 is about 2 microns to about 50 microns.

A more detailed discussion of formation of CNTs according to the second method may be found U.S. Pat. No. 6,232,706 to Dai et al., filed on Nov. 12, 1998, which is hereby incorporated by reference in its entity.

Figure 2E:
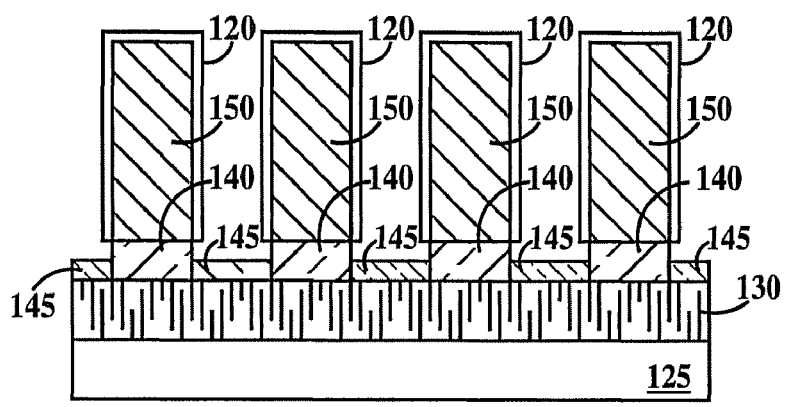

In FIG. 2E, chemically active layer 120 is formed on CNTs within each CNT bundle 150 and then substrate 125 with attached CNTs is packaged into filters. Again, forming of chemically active layer 120 is discussed infra in more detail.

In a first alternative version of the second method of forming CNTs described supra, instead of depositing iron through a shadow mask, a blanket iron layer is deposited and a random array of CNT bundles will be produced. A blanket layer of iron may be deposited by evaporation or by spinning a concentrated iron salt solution onto the substrate and evaporating off the solvent.

In a second alternative version of the second method of forming CNTs described supra, instead of using a porous substrate a catalytic layer or patterned catalytic layer is formed directly on a substrate such as quartz, ceramics, alumina, sapphire and silica.

Figure 3:
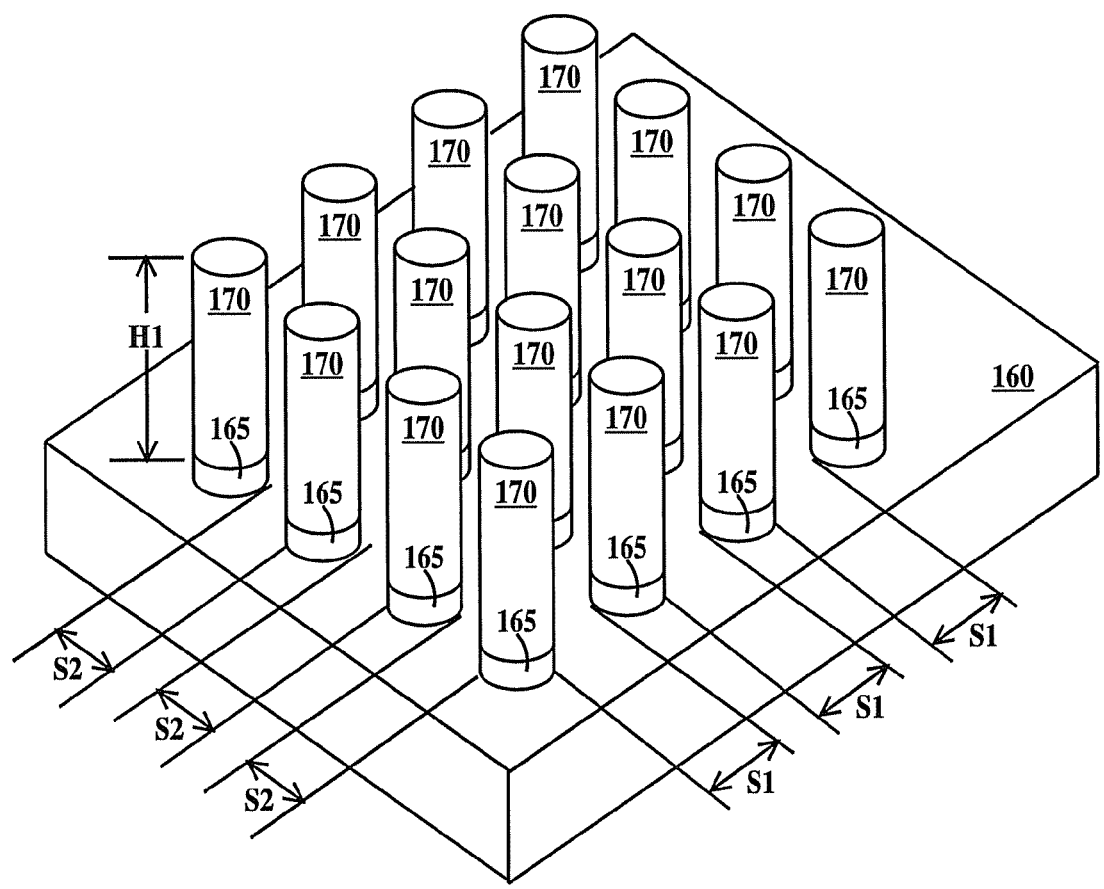
FIG. 3 is a isometric view of carbon nanotubes made by the methods illustrated in FIGS. 1A through 1D and 2A through 2D.

FIG. 3 is an isometric view of CNTs made by the methods illustrated in FIGS. 1A through 1D and 2A through 2D. In FIG. 3, formed on a substrate 160 are islands 165. Grown on islands 165 are CNTs 170. Substrate 160 represents either substrate 100 (see FIG. 1A) or substrate 125 (see FIG. 2A). Islands 165 represent either template islands 110 (see FIG. 1C) or catalytic template islands 140 (see FIG. 2C). CNTs 170 represent CNTs 110 (see FIG. 2C) or CNT bundles 150 (see FIG. 2D). CNTs 170 are spaced in rows and columns with rows spaced a distance S1 apart and columns spaced a distance S2 apart. CNTs 170 have a height H1. Because the spaces S1 and S2 can be selected during manufacturing and height H1 controlled during manufacturing process, spaces S1 and S2 and height H1 can be selected to provide, first, sufficient space to allow room for functional groups to be attached to CNTs 170 and to provide the most efficient spacing between CNTs with functional groups attached for attracting and capturing airborne contaminants or contaminants in gas streams.

Figure 4A:
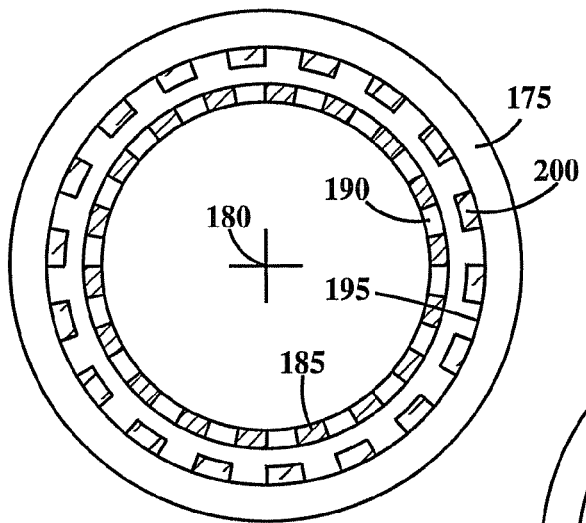
FIG. 4A is cross-section view illustrating one process step of a third method for making carbon nanotubes.

FIG. 4A is cross-section view illustrating one process step of a third method for making carbon nanotubes. The third method of the present invention utilizes the processes described supra for the first and second methods of the present invention except the substrate is a hollow cylinder instead of a flat substrate. In FIG. 4A, a cylindrical substrate 175 has a longitudinal axis 180 extending into and out of the plane of the paper. A cylindrical shadow mask 185 having a pattern of openings 190 is positioned between longitudinal axis 180 and an inner surface 195 of substrate 175 and catalytic islands 200 formed by evaporation or deposition (for example chemical vapor deposition (CVD)) through opening 190 in shadow mask 185. The shadow mask is then removed and CNTs grown on catalytic islands 200 using either of the first or second methods described supra or other methods known in the art.

Figure 4B:
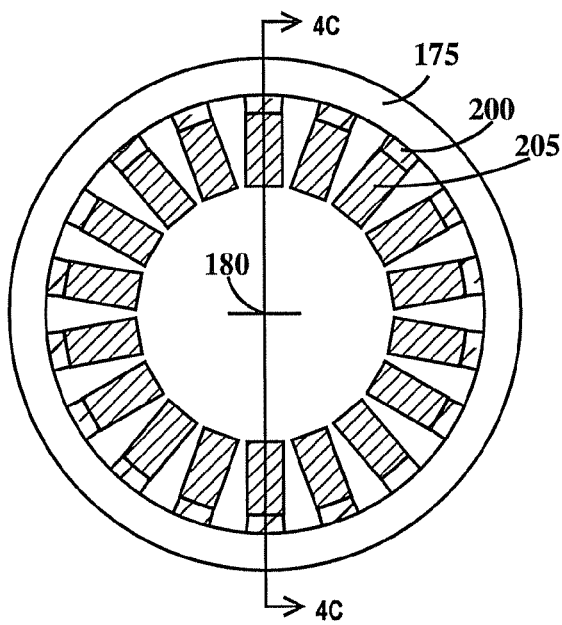
FIG. 4B is an end view and FIG. 4C is a cross-sectional view through line 4C-4C of FIG. 4B of nanotubes made by the third method of making carbon nanotubes.
Figure 4C:
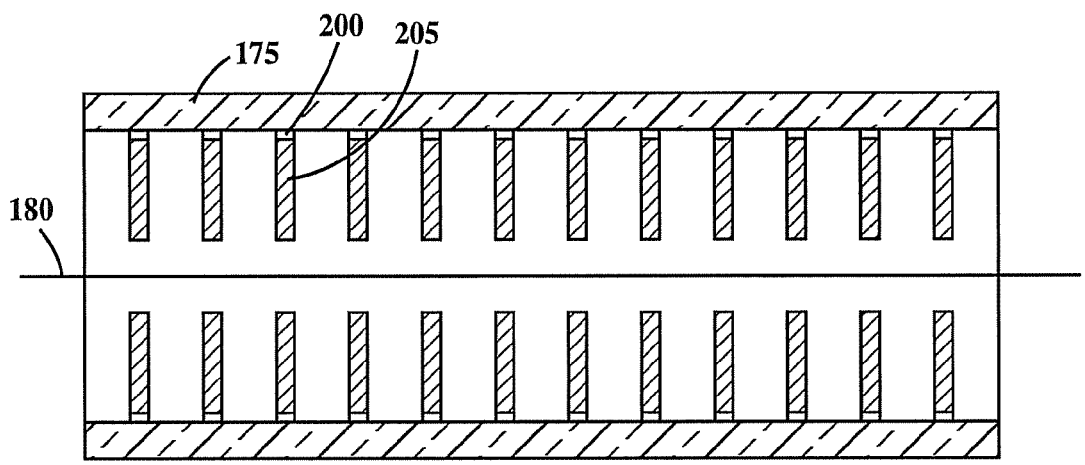

FIG. 4B is an end view and FIG. 4C is a cross-sectional view through line 4C-4C of FIG. 4B of CNTs made by the third method of making carbon nanotubes. In FIG. 4B, CNTs or CNT bundles 205 have been grown on catalytic islands 200 and chemically active as described infra and then packaged into filters. As illustrated, growth of CNTs or CNT bundles 205 has been stopped prior to adjacent CNTs or CNT bundles touching. In an alternative methodology, CNTs or CNTs 205 are allowed to grow to fill the interior volume of cylindrical substrate 175 with a tangle of CNTs and CNT bundles.

Figure 5:
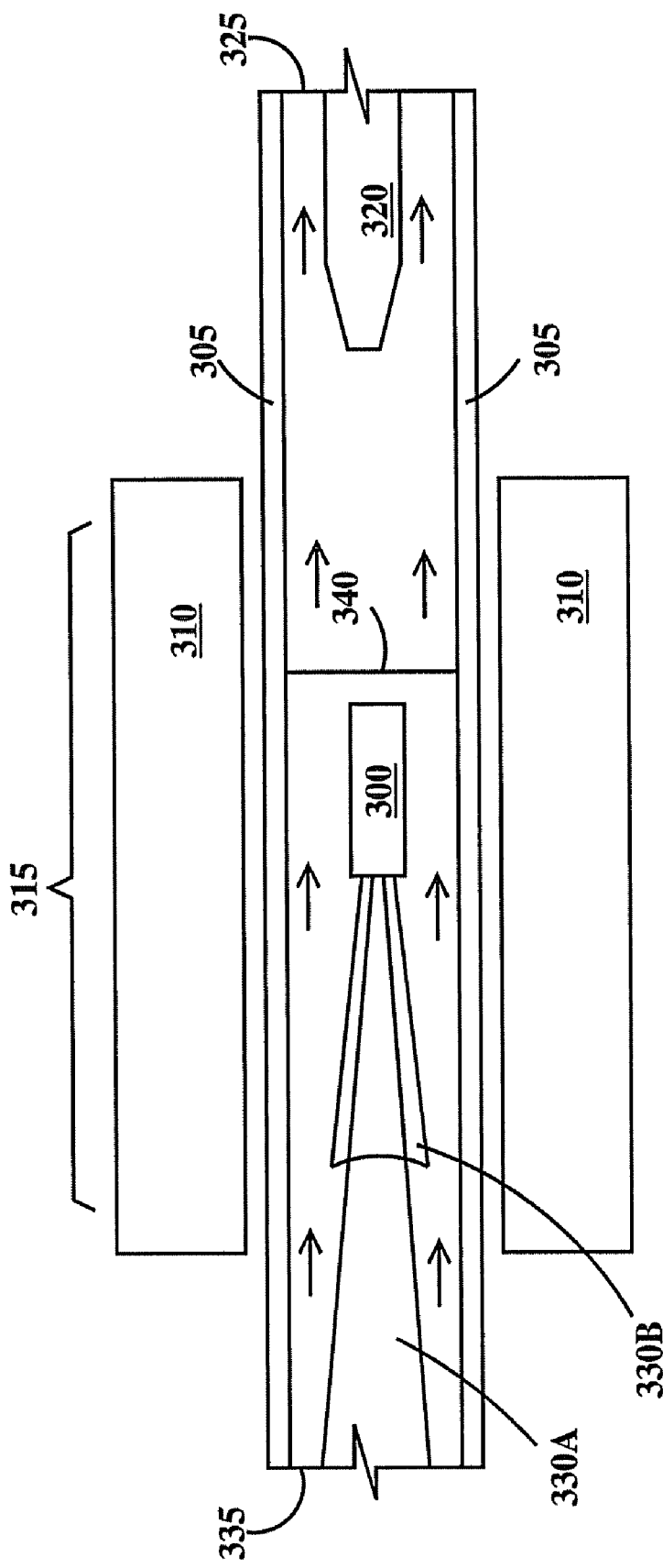
FIG. 5 is a schematic drawing of an apparatus for making carbon nanotubes according to a fourth and fifth method.

FIG. 5 is a schematic drawing of an apparatus for making carbon nanotubes according to a fourth and fifth method. In FIG. 5, a target 300 is placed within a tube 305. Target 300 comprises carbon and one or more metals such as cobalt (Co), Ni and Fe, which are carbon nanotube catalysts. A heating element 310 surrounds tube 305. Heating element 310 generates a heated zone 315 within tube 305. A cooled collector 320 is positioned at a downstream end 325 of tube 305 outside of heated zone 315. A first laser beam 330A and an optional second laser beam 330B generated by lasers (not shown) are allowed to impinge on target 300 from an upstream end 335 of tube 305. An optional tungsten wire or mesh 340 is stretched across the diameter of tube 305 between target 300 and collector 320. Wire or mesh 340 is positioned in heated zone 315. An inert sweep gas such as argon or helium is introduced into tube 305 from upstream end 335 of the tube.

In operation, target 300 is heated to between about 1100° C. to about 1300° C. The sweep gas may be optionally heated before it enters tube 305. In one example, the sweep gas is heated to a temperature between about 400° C. to about 1500° C. Collector 320 is maintained at a temperature between about 50° C. to about 700° C. Laser beam 330A (and optional laser beam 330B) convert portions of target 300 to mixture of carbon vapor and one or more of Co, Ni and Fe metal vapors. The mixture of carbon vapor and one or more of Co, Ni and Fe metal vapors is swept by the sweep gas and forms CNTs in heated zone 315 which are then collected on collector 320. CNTs grow because the group VI or VIII metals catalyze the growing end of each CNT.

If wire or mesh 340 is present, then the CNTs produced will be longer. They can be as long as the distance between the wire or mesh and collector 320. When a wire or mesh is used, group VI or VIII metal vapor is not required after initial formation of "seed" CNTs caught on the wire or mesh. Thus, target 300 can be replaced with a target that contains only carbon, or target 300 can have an upstream end that contains group VI or VIII metals while the bulk of the target contains only carbon.

The CNTs generated when group VI or VIII metals are present in target 300 are predominantly SWNTs. They can have a diameter of about 13.6 microns and lengths of about 0.1 micron to about 1000 microns. CNTs are collected at collector 320 as tangled collection of individual CNTs stuck together in a mat.

In a first alternative version of the third method of forming CNTs described supra, no group VI or VIII metals are present in target 300 and wire or mesh 340 is not used so closed spheroid cage fullerenes are produced instead of CNTs.

In a second alternative version of the third method of limning CNTs (utilizing wire or mesh 340) described supra, the lasers are turned off after the "seed" CNTs are formed and a hydrocarbon gas added to the sweep gas. Hydrocarbons that may be used include methane, ethane, propane, butane, olefinic, cyclic or aromatic hydrocarbon, or any other hydrocarbon.

CNTs produced by the third method described supra, often need to be purified of group VI and VIII metals, amorphous carbon, and other contaminants. There are many methods known in the art to do this. In one example, the mat of CNTs is heated in an acidic oxidizing solution. The "washed" CNTs may be collected in porous polytetrafluoro-ethylene filters.

A more detailed discussion of formation of CNTs according to the third method of forming CNTs may be found in United States Patent Publication US 2002/0090330 to Smalley et al., filed on Dec. 28, 2001, which is hereby incorporated by reference in its entity.

After the mat of CNTs are formed and cleaned, a chemically active layer is formed on the CNTs as described infra, before being packaged into filters.

Formation of active layers (either as a chemically active layer on CNTs or as chemically reactive groups on the sidewalls of CNTs) is conducted on CNTs formed on substrates while the CNTs are still on the substrate or in the form of CNT mats.

Many examples forming a chemically active layer on CNTs are known and several will now be described.

In a first example an osmium dioxide layer is formed on CNTs by mixing CNTs with osmium tetroxide ($OsO_4$) in toluene at 25° C. for 2 hours in the presence of irradiation with light having a wavelength of 254 nm forming $OsO2$ nanocrystals on the surfaces of the CNTs.

In a second example, a platinum layer is formed on CNTs by pre-treating the CNTs with a nitric acid and sulfuric acid mixture at 100° C. for 30 minutes, heating the CNTs to about 700° C. for about an hour, reacting the CNTs with an alcohol solution of hexachloroplatinic acid, and then heated the CNTs to 700° C., in hydrogen or nitrogen gas. Platinum nanocrystals are formed along the length of the CNTs.

In a third example, Ti, Ni, Au, Pd, Al or Fe layers are formed on CNTs by evaporation of the Ti, Ni, Au, Pd, Al or Fe respectfully onto CNTs. Metal thickness range from about 0.5 nm to about 15 nm. Ti forms Ti nano-wires, Ni and Pd form uniform coatings, and Au, Al and Fe form fine particles on the surface of the CNTs.

In a fourth example an $SiO_x$ layer is formed on CNTs by immersion in an aqueous solution of about 0.25% polyethylimine, followed by drying and reaction with an aqueous solution of tetraethoxysilane (TEOS), with ultrasonic agitation. After about 96 hours at about 25° C., the $SiO_x$ deposition can be terminated. In one example the $SiO_x$ layer is about 3 nm thick.

Many examples of forming chemically reactive groups on the sidewalls of CNTs are known and several will now be described.

In a first example, alkyl groups may be attached to the sidewalls of CNTs by reacting an alkyl lithium or alkyl magnesium (Grignard) reagent with fluorinated CNTs (see infra for preparation of fluorinated CNTs). In the case of alkyl lithium reagent, the reaction with fluorinated CNTs is performed in hexane for about 5 to about 10 minutes at about 25° C. In the case of alkyl magnesium reagent, the reaction with fluorinated CNTs is performed in tetrahydrofuran (THF) for 4 hours at about 25 C. Residual fluorine present on the CNTs after reaction with the alkylating agent can be removed with hydrazine, THF and isopropanol mixture at about 25° C. for about 30 minutes.

In a second example, fluoro groups may be attached to the sidewalls of CNTs by reacting CNTs with $F_2$ gas, diluted with an inert gas such as He or Ar, at temperatures of about 150° C. to about 60° C. for about 1 to 4 hours.

In a third example, aryl groups may be attached to the sidewalls of CNTs by reaction of CNTs with diazonium salts at about 25° C. in acetonitrile, with 5% of the carbon atoms of the CNT being arylated. Alternatively, the reaction can be performed at about 55° C. to about 60° C. for about 48 hours in a 5:1 mixture of orthodichlorobenzene and THF, using an aryl amine and isoamyl nitrite as an in situ source of diazonium salt. The aryl groups attached to CNT sidewalls may themselves be substituted by using diazonium salts having functional ester, nitro, alkyl, carboxyl, alkyl ether, and acetylenic moieties.

In a fourth example, pyrrolidine groups and substituted pyrrolidine groups such as alkyl, alkyl ether and aryl substituted pyrrolidine may be attached to the sidewalls of CNTs by the reaction of CNTs with aldehydes together with N-substituted glycine derivatives at about 130° C. in dimethylformamide (DMF) solvent for about 48 hours.

In a fifth example, hydrogen may be attached to the sidewalls of CNTs by reaction with lithium metal in liquid ammonia, with approximately 10% of the carbon atoms of the CNTs being hydrogenated.

In a sixth example, amino groups may be attached to the sidewalls of CNTs by exposing CNTs to low-pressure ammonia plasma or a low-pressure ethylenediamine plasma. Exemplary plasma conditions are a pressure of about 0.3 torr, a RF frequency of about 200 kHz, an RF power of about 20 watts, for about 1 minute at about 25° C. Amines can also be produced on CNTs by chemical reduction of attached imine groups (described infra) with, for example, sodium cynaoborohydride as the reducing agent.

In a seventh example, aldehyde groups may be attached to the sidewalls of CNTs by exposing CNTs to low-pressure acetaldehyde plasma. Exemplary plasma conditions are a pressure of about 0.3 ton, a RF frequency of about 200 kHz, an RF power of about 20 watts, for about 1 minute at about 25° C.

In an eighth example, carboxylic groups may be attached to the sidewalls of CNTs by exposing CNTs to a low-pressure acetic acid plasma. Exemplary plasma conditions are a pressure of about 0.3 torr, a RF frequency of about 200 kHz, an RF power of about 20 watts, for about 1 minute at about 25° C.

In a ninth example, amido groups may be attached to the sidewalls of CNTs by Amide functionality can be created by an aqueous reaction of the carboxylic acid derivative of CNTs (see supra) with amines in the presence of EDC (1-ethyl-3-(dimethylaminopropyl)carbo-di-imide) coupling agent at about 25° C.

In a tenth example, imino groups may be attached to the sidewalls of CNTs by converting attached aldehyde groups (see supra) to imino groups by reaction with alkyl amine vapor or ammonia vapor. Also, attached imino groups can be created by reaction amine functionalized CNTs (see supra) with ketones or aldehydes. In one example, these reactions are performed in aqueous solution at about 25° C. at a pH of about 6 to about 8 over a period of about 24 hours.

In an eleventh example, sulfonic groups may be attached to the sidewalls of CNTs by gas phase sulfonation at about 25° C. for about 2 to about 5 minutes with a mixture of about 1% by weight $SO_3$ in $N_2$. First an acetaldehyde plasma treatment, or alkane plasma treatment (methane, ethane, propane, hexane, etc) is performed to form a hydrocarbon on the surface of the CNT.

The next step is to package the CNTs having a chemically active layer or CNTs having chemically reactive groups on their sidewalls into filters.

FIG. 6A is a cross-section view and FIG. 6B is a cross-section view through line 6B-6B of FIG. 6A of a first exemplary chemically active nanotube filter according to the present invention. In FIGS. 6A and 6B, a single substrate 400 having a multiplicity of CNTs 405 has been packaged into a filter housing 410 having an inlet 415 and an outlet 420. CNTs 405 have either a chemically active layer on the CNTs or chemically reactive groups on the sidewalls of the CNTs.

FIG. 7A is a cross-section view and FIG. 7B is a cross-section view through line 7B-7B of FIG. 7A of a second exemplary chemically active nanotube filter according to the present invention. In FIGS. 7A and 7B, multiple substrates 400A each having a multiplicity of CNTs 405A and multiple substrates 400B each having a multiplicity of CNTs 405B have been packaged into a filter housing 425 having an inlet 430 and an outlet 435. CNTs 405A have either a chemically active layer on the CNTs or chemically reactive groups on the sidewalls of the CNTs. CNTs 405B have either a chemically active layer on the CNTs or chemically reactive groups on the sidewalls of the CNTs. The chemically active layer or chemically reactive groups may be the same on CNTs 405A and 405B or the chemically active layer or chemically reactive groups on CNTs 405A may be different from the chemically active layer or chemically reactive groups on CNTs 405B. Increasing the number of substrate 400A/CNTs 405A and 400B/CNTs 405B sets allows an increased flow rate of the air or gas being filtered and/or increase the lifetime of the filter. By having different chemically active layer or chemically reactive groups on CNTs 405A and 405B, multiple different contaminants can be removed from the air. There may be as many substrate/CNTs combinations, each combination having different chemically active layers or chemically reactive groups as needed by a particular filtering application.

FIG. 8A is a cross-section view and FIG. 8B is a cross-section view through line 8B-8B of FIG. 8A of a third exemplary chemically active nanotube filter according to the present invention. In FIGS. 8A and 8B, a single hollow cylindrical substrate 440 having a multiplicity of CNTs 445 has been packaged into a hollow cylindrical filter housing 450 having an inlet 455 and an outlet 460. CNTs 440 have either a chemically active layer on the CNTs or chemically reactive groups on the sidewalls of the CNTs.

FIG. 8C, is an extension of the third exemplary chemically active nanotube filter of FIGS. 8A and 8B. In FIG. 8C, a hollow cylindrical substrate 440A having a multiplicity of CNTs 445A and a hollow cylindrical substrate 440B having a multiplicity of CNTs 445B have been packaged into a hollow cylindrical filter housing 465 having an inlet 470 and an outlet 475. CNTs 445A have either a chemically active layer on the CNTs or chemically reactive groups on the sidewalls of the CNTs. CNTs 445B have either a chemically active layer on the CNTs or chemically reactive groups on the sidewalls of the CNTs. The chemically active layer or chemically reactive groups may be the same on CNTs 445A and 445B or the chemically active layer or chemically reactive groups on CNTs 445A may be different from the chemically active layer or chemically reactive groups on CNTs 445B. More than two hollow cylindrical substrates each having a multiplicity of CNTs may be arranged in series in a filter housing.

Figure 9A:
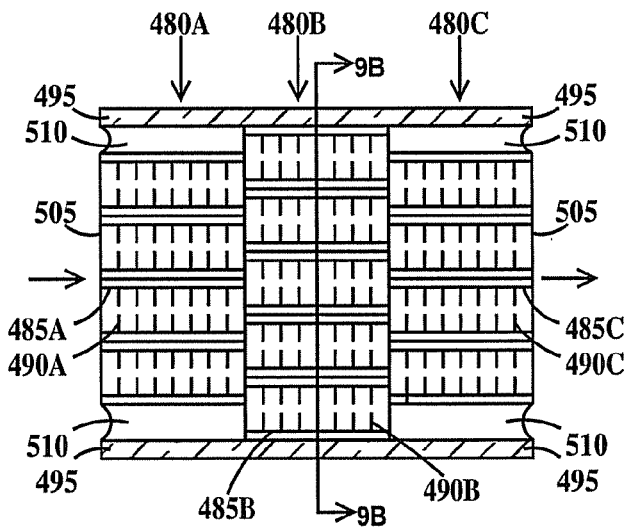
FIG. 9A is a cross-section view and FIG. 9B is a cross-section view through line 9B-9B of FIG. 9A of a fourth exemplary chemically active nanotube filter according to the present invention.
Figure 9B:
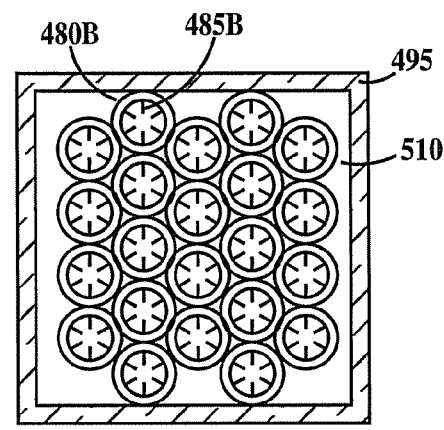

FIG. 9A is a cross-section view and FIG. 9B is a cross-section view through line 9B-9B of FIG. 9A of a fourth exemplary chemically active nanotube filter according to the present invention. In FIGS. 9A and 9B, a first layer 480A of hollow cylindrical substrates 485A having a multiplicity of CNTs 490A, a second layer 480A of hollow cylindrical substrates 485B having a multiplicity of CNTs 490C and a third layer 480C of hollow cylindrical substrates 485C having a multiplicity of CNTs 490C have been packaged into a filter housing 495 having an inlet surface 500 and an outlet surface 505. Layer 480B is positioned between layers 480A and 480C. Individual hollow cylindrical substrates 485A, 485B and 485C are positioned so air or gas entering filter housing 495 from inlet surface 500 can pass over the multiplicity of respective CNTs 490A, 490B and 490C and exit the filter housing from outlet surface 505. A sealant 510 holds individual hollow cylindrical substrates 485A, 485B and 485C in position relative to filter housing 495 and relative to each other. Spaces between substrates 385A, 485B and 485C are filled with sealant forcing air or gas to pass over CNTs in substrates 485A, 485B and 485C. CNTs 490A, 490B and 490C have either a chemically active layer on the CNTs or chemically reactive groups on the sidewalls of the CNTs. The chemically active layer or chemically reactive groups may be the same on CNTs 490A, 490B and 490C or the chemically active layer or chemically reactive groups on CNTs 490A, 490B and 490C may be different from one another. While three layers 480A, 480B and 480C are illustrated, as few as one layer and as many as needed layers may be packaged together in the manner illustrated in FIGS. 9A and 9B.

Figure 10A:
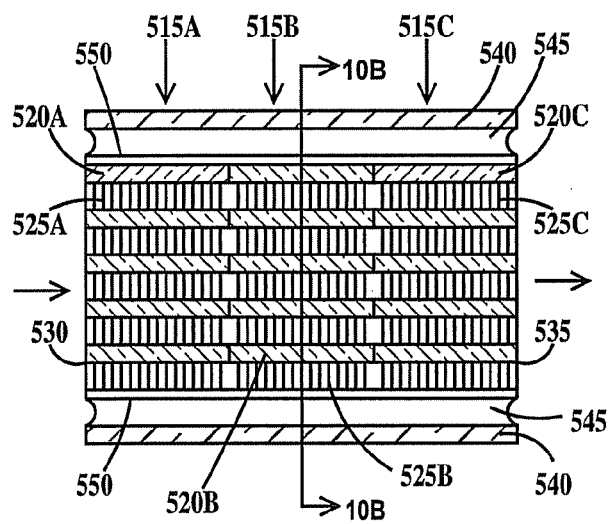
FIG. 10A is a cross-section view and FIG. 10B is a cross-section view through line 10B-10B of FIG. 10A of a fifth exemplary chemically active nanotube filter according to the present invention.
Figure 10B:
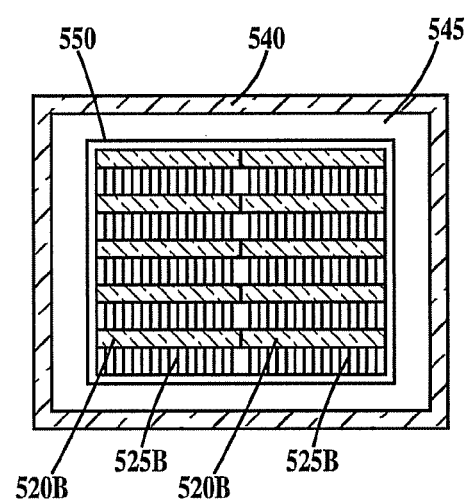

FIG. 10A is a cross-section view and FIG. 10B is a cross-section view through line 10B-10B of FIG. 10A of a fifth exemplary chemically active nanotube filter according to the present invention. In FIGS. 10A and 10B, a first layer 515A of substrates 520A having a multiplicity of CNTs 525A, a second layer 515A of substrates 520B having a multiplicity of CNTs 525C and a third layer 515C of substrates 520C having a multiplicity of CNTs 525C have been packaged into a filter housing 540 having an inlet surface 530 and an outlet surface 535. Layer 515B is positioned between layers 515A and 515C. Individual substrates 520A, 520B and 520C are positioned so air or gas entering filter housing 540 from inlet surface 530 can pass over the multiplicity of respective CNTs 525A, 525B and 525C and exit the filter housing from outlet surface 535. A sealant 545 holds individual substrates 520A, 520B and 520C in position relative to filter housing 540 and relative to each other. An optional thin sheath 550 is positioned around layers 515A, 515B and 515C to prevent sealant from clogging CNTs on peripheral substrates 520A, 520B and 520C. CNTs 525A, 525B and 525C have either a chemically active layer on the CNTs or chemically reactive groups on the sidewalls of the CNTs. The chemically active layer or chemically reactive groups may be the same on CNTs 525A, 525B and 525C or the chemically active layer or chemically reactive groups on CNTs 525A, 525B and 525C may be different from one another. While three layers 515A, 515B and 515C are illustrated, as few as one layer and as many as needed layers may be packaged together in the manner illustrated in FIGS. 10A and 10B.

Figure 11A:
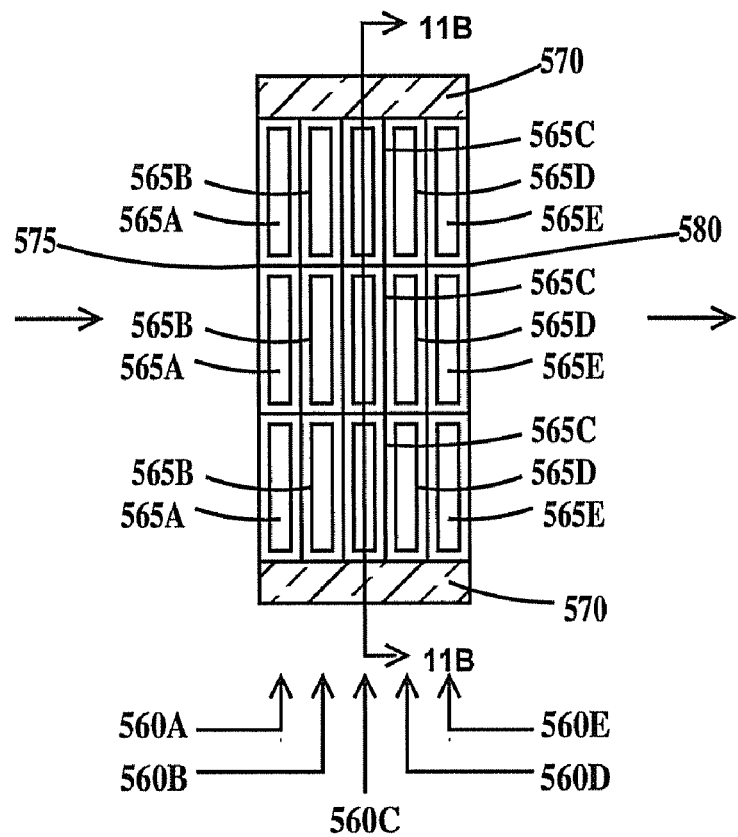
FIG. 11A is a cross-section view and FIG. 11B is a cross-section view through line 11B-11B of FIG. 11A of a sixth exemplary chemically active nanotube filter according to the present invention.
Figure 11B:
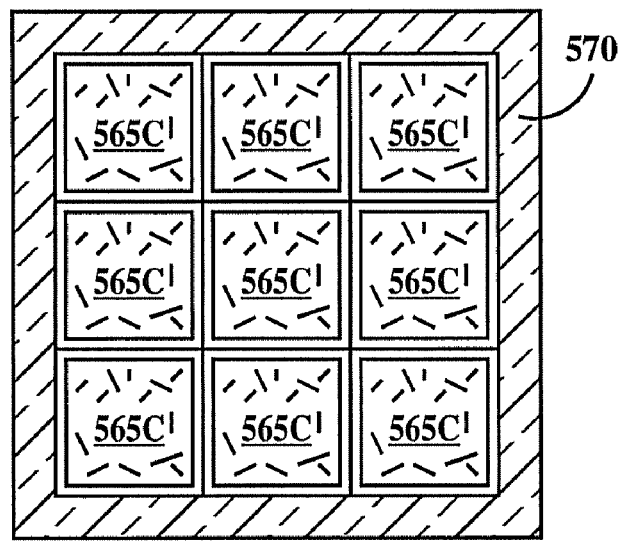

FIG. 11A is a cross-section view and FIG. 11B is a cross-section view through line 11B-11B of FIG. 11A of a sixth exemplary chemically active nanotube filter according to the present invention. In FIGS. 11A and 11B, a first layer 560A of porous walled containers 565A filled with mats of chemically active CNTs, a second layer 560B of porous walled containers 565B filled with mats of chemically active CNTs, a third layer 560C of porous walled containers 565C filled with mats of chemically active CNTs, a fourth layer 560D of porous walled containers 565D filled with mats of chemically active CNTs and a fifth layer 560E of porous walled containers 565E filled with mats of chemically active CNTs have been packaged into a filter housing 574 having an inlet surface 575 and an outlet surface 580. Layer 560C is the innermost layer and is positioned between layers 560B and 560D. Layer 560B is positioned between layers 560A and 560C. Layer 560D is positioned between layers 560C and 560E. Air or gas entering filter housing 570 from inlet surface 575 passes through each layer 560A, 560B, 560C, 560D and 560E of respective porous containers 565A, 565B, 565C, 565D and 525E and exit the filter housing from outlet surface 580. The CNTs mats in porous containers 565A, 565B, 565C, 565D and 565E have either a chemically active layer on the CNTs or chemically reactive groups on the sidewalls of the CNTs. The chemically active layer or chemically reactive groups may be the same on CNT mats in porous containers 565A, 565B, 565C, 565D and 565E or the chemically active layer or chemically reactive groups in some or all of porous containers 565A, 565B, 565C, 565D and 565E 525C may be different from one another. While five layers 560A, 560B, 560C, 560D and 560E are illustrated, as few as one layer and as many as needed layers may be packaged together in the manner illustrated in FIGS. 11A and 11B.

Figure 12:
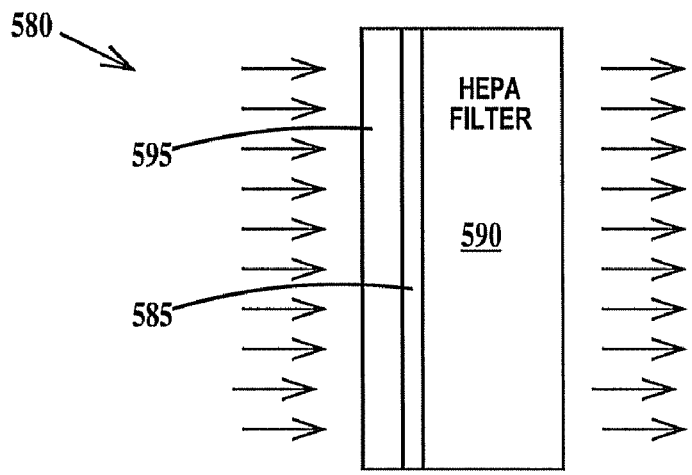
FIG. 12 is a cross-section view of a modified high efficiency particulate air filter according to the present invention.

FIG. 12 is a cross-section view of a modified high efficiency particulate air (HEPA) filter according to the present invention. In FIG. 12, a filter assembly 580 includes a chemically active CNT filter 585 between a HEPA filter 590 and an optional pre-filter 595. Chemically active CNT filter may be a filter as illustrated in FIGS. 9A and 9B, 10A and 10B, or 11A and 11B and described supra or a mat or set of mats of chemically active CNTs, the CNTs having either a chemically active coating or a chemically reactive group on sidewalls of the CNTs.

Figure 13:
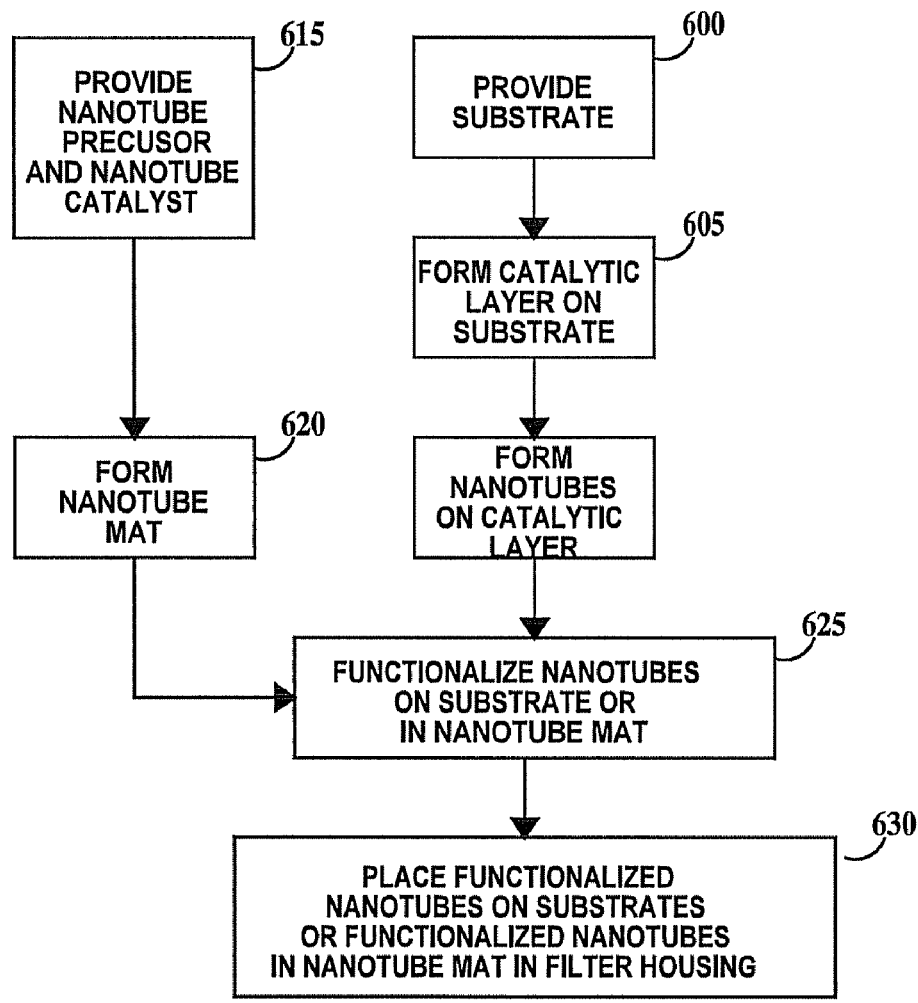
FIG. 13 is a flowchart of the method of making chemically active nanotube filters according to the present invention.

FIG. 13 is a flowchart of the method of making chemically active nanotube filters according to the present invention. In step 600, a substrate is provided. In step 605 a catalytic layer is formed on the substrate. The catalytic layer may be optionally patterned. In step 610, CNTs are formed on the catalytic layer. As an alternative to steps 600, 605 and 610, steps 615 and 620 may be performed. In step 615 a CNT precursor and CNT catalyst are provided. In step 620, a CNT mat is fanned. In step 615, the CNTs on the substrate from step 610 or the CNTs in the CNT mat from step 620 are chemically activated by either forming a reactive layer on the CNTs or forming reactive groups on the sidewalls of the CNTs. In step 630, the substrates with chemically active CNTs or the chemically active CNT mat are placed in a filter housing.

Figure 14:
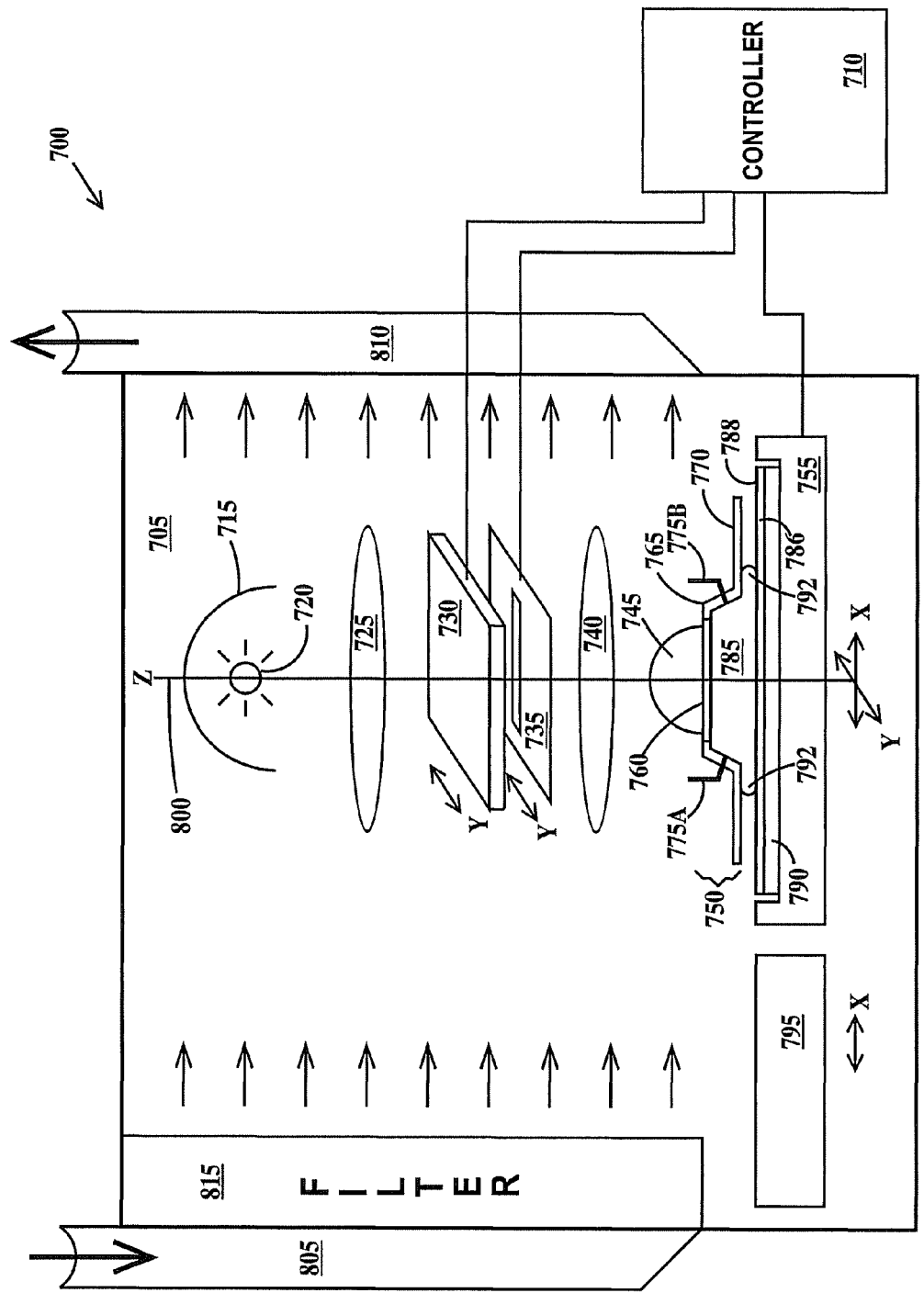
FIG. 14 is a pictorial representation of an exemplary immersion lithography system incorporating a chemically active nanotube air filter according to the present invention.

FIG. 14 is a pictorial representation of an exemplary immersion lithography system incorporating a chemically active nanotube air filter according to the present invention. In FIG. 14, an immersion lithography system 700 includes a controlled environment chamber 705 and a controller 710. Contained within controlled environment chamber 705 is a focusing mirror 715, a light source 720, a first focusing lens (or set of lenses) 725, a mask 730, an exposure slit 735, a second focusing lens (or set of lenses) 740, a final focusing lens 745, an immersion head 750 and a wafer chuck 755. Immersion head 750 includes a transparent window 760, a central chamber portion 765, a surrounding plate portion 770, an immersion liquid inlet 775A and an immersion liquid outlet 775B. An immersion liquid 785 fills central chamber portion 765 and contacts a photoresist layer 786 on a top surface 788 of a wafer 790. Plate portion 770 is positioned close enough to photoresist layer 786 to form a meniscus 792 under plate portion 770. Window 760 must be transparent to the wavelength of light selected to expose photoresist layer 786. In one example window 760 is transparent to a wavelength of about 190 nm or less.

Focusing mirror 715, light source 720, first focusing lens 725, a mask 730, exposure slit 735, second focusing lens 740, final focusing lens 745, immersion head 750 are all aligned along an optical axis 800 which also defines a Z direction. An X direction is defined as a direction orthogonal to the Z direction and in the plane of the drawing. A Y direction is defined as a direction orthogonal to both the X and Z directions. Wafer chuck 755 may be moved in the X and Y directions under the direction of controller 710 to allow formation of regions of exposed and unexposed photoresist in photoresist layer 786. As XY-stage moves, new portions of photoresist layer 786 are brought into contact with immersion liquid 785 and previously immersed portions of the photoresist layer are removed from contact with the immersion liquid. Mask 730 and slit 735 may be moved in the Y direction under the control of controller 710 to scan the image (not shown) on mask 730 onto photoresist layer 786. In one example, the image on mask 730 is a 1× to a 10× magnification version of the image to be printed and includes one or multiple integrated circuit chip images.

When exposure is complete, wafer 790 must be removed from controlled environment chamber 705 without spilling immersion fluid 785. To this end, controlled environment chamber 705 also includes a cover plate 795 that may be moved to first abut with wafer chuck 755 and then move with the wafer chuck as the wafer chuck is moved out of position from under immersion head 750, the cover plate replacing the wafer chuck under immersion head 750.

Controlled environment chamber 705 includes a supply plenum 805 and an exhaust plenum 810. Air or inert gas is passed from supply plenum 805, through a filter 815, through controlled environment chamber 705 and into exhaust plenum 810. Because of the high energy and high intensity light used in immersion lithography system 700, which can cause various reactions with contaminants in the air or inert gas flowing through controlled environment chamber 705 that can then deposit over tool components and wafer 790 as unwanted polymers, filter 815 contains chemically active CNTs having either chemically reactive layers or chemically reactive groups on the sidewalls of the CNTs whose preparation has been described supra. Any of the filters illustrated in FIGS. 9A and 9B, 10A and 10B, 11A and 11B or 12 and described supra may be used for filter 815.

While an immersion exposure system has been illustrated in FIG. 14, the present invention is applicable to any lithographic system.

Thus, the present invention provides an advanced chemical and particulate filter for applications requiring extremely low levels of contaminants in the filtered air and/or gas streams.

The description of the embodiments of the present invention is given above for the understanding of the present invention. It will be understood that the invention is not limited to the particular embodiments described herein, but is capable of various modifications, rearrangements and substitutions as will now become apparent to those skilled in the art without departing from the scope of the invention. For example, while multiple methods of forming CNTs have been presented, other methods known in the art may be substituted. Likewise, while multiple examples of adding functionality to CNTs has been present, other methods of adding functionality to CNTs known to the art may be substituted. Additionally, CNTs and CNT bundles may be formed on porous substrates, i.e., substrates through which the fluid being filtered may pass, in which case the substrate may be mounted in the filter holder perpendicular to the flow of the fluid through the filter, the CNTs or CNT bundles being on the upstream side of the fluid flow. Therefore, it is intended that the following claims cover all such modifications and changes as fall within the true spirit and scope of the invention.

What is claimed is:

1. A filter, comprising: a filter housing having an inlet and a separate outlet; a layer of porous walled and closed containers in said filter housing; and each porous walled and closed container of said layer holding a tangled collection of individual chemically active carbon nanotubes stuck together in a mat, said chemically active carbon nanotubes comprising a chemically active layer formed on carbon nanotubes or comprising organic chemically reactive groups on sidewalls of said carbon nanotubes.

2. The filter of claim 1, further including:
one or more additional layers of porous walled and closed containers in said filter housing, each porous walled and closed container of said one or more additional layers of porous walled and closed containers holding a tangled collection of individual chemically active nanotubes.

3. The filter of claim 1, further including:
one or more additional layers of porous walled and closed containers in said filter housing, each porous walled and closed container of said one or more additional layers of porous walled and closed containers holding a tangled collection of individual chemically active nanotubes; and
wherein said chemically active nanotubes in at least two different layers of porous and closed containers have different chemically active layers or different organic chemically reactive groups from each other.

4. The filter of claim 1, wherein said chemically active layer comprises osmium oxide, platinum, titanium, nickel, gold, palladium, aluminum, iron or silicon oxides.

5. The filter of claim 1, wherein said chemically active groups are selected from the group consisting of alkyl groups, fluoro groups, aryl groups, pyrrolidine groups, hydrogen, amino groups, aldehyde groups, carboxylic groups, amido groups, imino groups and sulfonic groups.

6. The filter of claim 1, further including:
a high efficiency particulate air (HEPA) filter in said filter housing.

7. The filter of claim 6, further including:
a pre-filter, said a layer of porous walled and closed containers between said HEPA filter and said pre-filter.

8. A filter, comprising: a filter housing having an inlet and a separate outlet; a porous media in said filter housing; a tangled collection of individual chemically active carbon nanotubes stuck together in a mat on a surface of said porous media, said chemically active carbon nanotubes comprising a chemically active layer formed on carbon nanotubes or comprising chemically reactive organic groups on sidewalls of said carbon nanotubes; and wherein said porous media is a high efficiency particulate air (HEPA) filter.

9. The filter of claim 8, further including:
a pre-filter, said mat of chemically active carbon nanotubes between said HEPA filter and said pre-filter.

10. The filter of claim 8, wherein said chemically active layer comprises osmium oxide, platinum, titanium, nickel, gold, palladium, aluminum, iron or silicon oxides and said chemically active groups are selected from the group consisting of alkyl groups, fluoro groups, aryl groups, pyrrolidine groups, hydrogen, amino groups, aldehyde groups, carboxylic groups, amido groups, imino groups and sulfonic groups.

* * * * *